3,356,631
CHLORINATED POLYESTERS
Winston J. Jackson, Jr., and John R. Caldwell, Kingsport, Tenn., assignors to Eastman Kodak Company, Rochester, N.Y., a corporation of New Jersey
No Drawing. Filed Feb. 20, 1964, Ser. No. 346,125
24 Claims. (Cl. 260—31.2)

This invention relates to chlorinated linear polyesters and to the process for preparing the same.

It is of course well known that a large variety of relatively high melting, linear polyesters useful as fibers, films, and the like may be prepared by reacting dibasic acids with diols. Many of these polymers, particularly those prepared from aromatic acids, are quite insoluble however, in the more volatile and desirable polymer solvents such as methylene chloride, chloroform, and dioxane which boil at 40.1° C., 61.2° C., and 101.3° C., respectively; and consequently, melt spinning, extruding, and molding represent the only practical methods for forming these polymers into useful shapes. In fact, many of the polymers are difficult to dissolve in solvents such as tetrachloroethane and pentachloroethane, which boil at 146.5° C. and 159.1° C., respectively. Moreover, polyesters are flammable and, therefore, limited to products which are not to be subjected to high temperatures and open flames.

Objects of the present invention, therefore, are: to provide a great variety of polyesters having many of the desirable properties such as toughness, relatively high melting points, and the like, of the heretofore known polyesters, and in addition having much greater processability by virtue of their solubility in low-boiling solvents which are easily flashed off from the formed product, and having markedly reduced tendency to burn; to provide polyester dopes which can be processed to formed articles by extruding, casting, drawing, spinning, and slush molding; and to provide a commercially practicable process for preparing such versatile and processable polyesters.

These and other objects hereinafter becoming apparent have been achieved in accordance with the present invention through the discoveries: (1) that polyesters in solution in suitable halogenated hydrocarbons may be substantially uniformly halogenated in a controlled manner to desired degrees without so reducing the hydrolytic, oxidative, and thermal stability of the polymers that they do not have considerable utility in the fields of protective coatings, packaging, film supports, electrical insulation, and the like; (2) that such halogenation renders even the most difficultly soluble polyesters readily soluble in the lower boiling, halogenated hydrocarbon solvents; and (3) that the admixture of from about 5 to about 50% by weight of trichloro- or trifluoroacetic acid with the halogenated hydrocarbon solvents will render even such insoluble polymers as poly(ethylene terephthalate), and the reaction products of dimethyl terephthalate and 1,4-cyclohexanedimethanol, and succinic acid and 1,4-cyclohexanediol, soluble and, therefore, readily chlorinatable. It is noted that practice of the present invention contemplates that at least 50% by weight of the chlorine is substituted for the hydrogens on —CH$_2$— groups which are covalently bonded to other carbon atoms.

Moreover, it has been found in accordance with the present invention, that the polyesters may be chlorinated without excessive degradation of the polymer by passing chlorine through a solution of the polymer in the presence of suitable chlorination promoting means. Also, it has been found that when the chlorine content of the polymers is above about 10% by weight, they become readily soluble in such volatile and easily flashed solvents as methylene chloride, chloroform and dioxane. Consequently, clear, tough films can be cast, and high-tenacity, self-extinguishing fibers spun from their solutions. Such films can be used as nonflammable protective coatings, photographic film base, electrical insulation, dielectrics for capacitors, etc. The polymers can also be used as an ingredient in paints to make them fire-resistant. Further, it has been found that when the chlorine content is above about 20% by weight, the polyesters become self-extinguishing. By "self-extinguishing" it is meant that a film of the polymer stops burning immediately upon removal from a flame. Polymers containing more chlorine are even more resistant to burning, and they can be prepared containing up to 50% by weight of chlorine.

In general, it may be said that the present invention is applicable to all polyesters including those prepared by reacting aromatic, alicyclic, aliphatic, and cycloaliphatic dibasic acids and their condensable derivatives such as the diesters, acyl chlorides and anhydrides, with aromatic, alicyclic, aliphatic, and cycloaliphatic diols and their condensable derivatives. The invention is also applicable to polyesters of various hydroxy acids such as 6-hydroxycaproic acid and the like.

Among the useful dibasic acids are 1,3-cyclopentanedicarboxylic acid, 1,3-cyclohexanedicarboxylic acid, 1,4-cyclohexanedicarboxylic acid, 2,5-norbornanedicarboxylic acid oxalic acid, malonic acid, adipic acid, 2-methyladipic acid, azelaic acid, sebacic acid, isosebacic acid, dodecylsuccinic acid, ethylenedioxybispropionic acid, p-phenylenediacetic acid, 1,4-cyclohexylenediacetic acid, and isopropylidene-(p-phenyleneoxy)diacetic acid.

Among the useful diols are ethylene glycol, 1,3-butanediol, 1,4-butanediol, 1,6-hexanediol, 1,10-decanediol, 2,2,4-trimethyl-1,3-pentanediol, diethylene glycol, p-xylylenediol, 2,5-norbornanediol, and 2,5-norbornanedimethanol.

The preparations of these polyesters, which should have an I.V. of at least about 0.3, are well known to the art. For example, poly(ethylene terephthalate), which is representative of highly useful and versatile polyesters, may be prepared with or without catalysts in the manner disclosed in U.S. Patent 2,465,319.

It is noted that the present invention is applicable to many modifications of linear polyesters known to the art, for example, the use of certain amounts of tri- or even more functional alcohols as disclosed in U.S. Patent 2,936,296. The essential points to be remembered in defining the scope of the present invention are (1) the novel manner of getting the polyesters in a condition suitable for chlorination; (2) the heretofore unattainable homogeniety and regulatability of the chlorination; and (3) the heretofore unknown and remarkable increase in solubility of the polyesters in low-boiling hydrocarbons. With these discoveries in mind, the applicability of the present invention to an almost limitless variety of polyesters becomes evident.

A group of polyesters to which the present invention is especially applicable are prepared from aromatic dibasic acids or their condensable derivatives such as the diesters, acyl chlorides and anhydrides, and cyclohexanedimethanol or its condensable derivatives and have the formula:

$$-\overset{\text{O}}{\underset{\|}{\text{C}}}-\text{R}-\overset{\text{O}}{\underset{\|}{\text{C}}}-\text{O}-\text{CH}_2-\text{R}'-\text{CH}_2-\text{O}-$$

wherein R is a bivalent radical selected from the group consisting of radicals of the formulas:

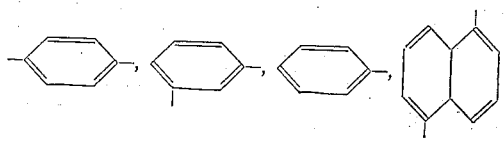

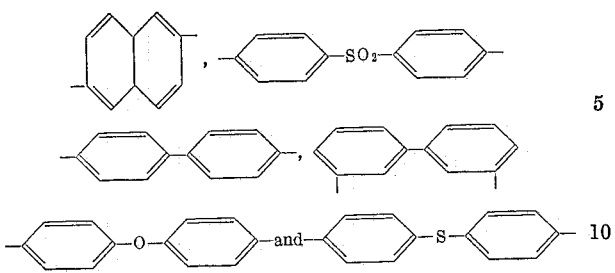

and R' is a bivalent radical selected from the group consisting of 1,2-, 1,3-, and 1,4-cyclohexylene radicals represented by the formulas:

respectively. The preparations of such polyesters are well known and the procedures disclosed, for example, in U.S. Patent 2,901,466 may be employed. Such processes generally employ polyvalent metal alkoxide or oxide catalysts such as antimony oxide and titanium tetrabutoxide and produce condensation products having inherent viscosities as measured in 60/40 (phenol/tetrachloroethane) at 25° C., of from about 0.4 to 2.0, and melting points of from about 150° C. to about 350° C. As aforesaid, these polymers are quite insoluble in solvents boiling below about 120° C. and thus have limited processability. Moreover, these polymers exhibit no substantial resistance to flaming.

The cyclohexanedimethanol used in preparing these polyesters may be 1,2-, 1,3-, or 1,4-cyclohexanedimethanol, and the —CH$_2$OH groups may be cis or trans to each other. The preferred diol is 1,4-cyclohexanedimethanol, which gives the highest melting polyesters. It is often advantageous to use a mixture of two or more diols to improve the solubility of the polyester in tetrachloroethane, the preferred chlorination solvent. Such mixtures may consist of cis and trans geometrical isomers, or they may also consist of position isomers, such as 1,2- and 1,4- or 1,3- and 1,4-isomers. In general, the polyesters of 1,4-cyclohexanedimethanol are the least soluble in tetrachloroethane and the highest melting, and those of 1,2-cyclohexanedimethanol are the most soluble and the lowest melting. It is often advantageous to form these polyesters as copolymers containing two or more of the above R radicals so the product will be sufficiently soluble in a solvent for chlorination to be effective. Dibasic acids which are particularly effective in giving copolyesters which are sufficiently soluble in tetrachloroethane, the preferred chlorination solvent, are isophthalic acid, and o-phthalic acid. Aliphatic dibasic acids also may be used to give copolymers which are soluble in tetrachloroethane, but aromatic acids are preferred.

The polyesters are chlorinated in accordance with the present invention by passing chlorine into solutions or suspensions of the polymers while illuminating with ultaviolet or visible light or while periodically adding a free-radical catalyst. Examples of such catalysts are t-butylperoxypivalate, diisopropylperoxydicarbonate, acetyl peroxide, and azobisisobutyronitrile. The preferred method is ultraviolet illumination. The chlorinations can be carried out at substantially atmospheric pressure or higher and from about 0 to about 100° C., but temperatures of 10°–40° C. are preferred. Appreciable degradation of the polymers takes place at the higher temperatures, and chlorination proceeds slowly at very low temperatures. Other chlorinating agents such as sulfuryl chloride, phosphorus pentachloride, or t-butylhypochlorite may be used, but chlorine is more effective. The chlorination reaction is more efficient if the polyester is in solution in a relatively inert solvent, but polymers which are sufficiently swollen by a solvent may also be chlorinated. The preferred solvent is tetrachloroethane, but pentachloroethane may also be used. It is not necessary for an HCl acceptor to be in the reaction mixture, but it is advantageous to use water to remove HCl from the organic phase, and powdered calcium carbonate to neutralize the HCl. Less breakdown of the polymer during chlorination then occurs. It is noted that when a trihalo acid is employed to facilitate solvation, water and CaCO$_3$ are not employed since reaction of the acid with CaCO$_3$ would occur.

After completion of the chlorination, sodium bicarbonate is added to ensure neutralization of all of the HCl which had been formed. If calcium carbonate is used in the reaction mixture and some carbonate remains, it is removed by filtration. After the polymer solution is thoroughly washed with water to remove all salts, it is slowly added to methanol or some other nonsolvent to precipitate the polymer as a white, fibrous product.

Referring to the polyesters of aromatic dibasic acids and the cyclohexanedimethanols, essentially no chlorination of the aromatic rings takes place under the aforesaid chlorination conditions. These chlorinated polymers consist of mixtures with the chlorine atoms attached to various positions on the cyclohexane rings. The chlorinated polyesters thus formed essentially comprise repeating units of the formula:

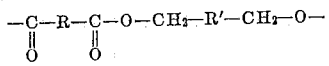

wherein R is as defined above and R' is a bivalent alicyclic radical selected from the group having the formulas:

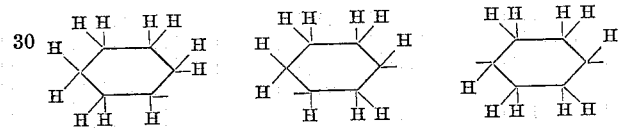

wherein from about 5 to about 60% of the hydrogen atoms of these alicyclic radicals are replaced by chlorine atoms.

It is particularly noted that to varying degrees, desirable properties of these new chlorinated polymers are realizable even though substantial amounts of modifying acids such as the aliphatic dibasic acids, and modifying alcohols such as the conventional esterification glycols are substituted for the aromatic dibasic acids and the cyclohexanedimethanols. Such substitutions lower the melting points of the polymers, and for this reason are not preferred. One aspect of the invention thus provides a great variety of highly polymeric, linear, chlorinated polyesters of a dibasic acid component at least 50 mole percent of which is an aromatic dibasic acid and a dihydroxy component at least 50 mole percent of which is at least one of the cyclohexanedimethanols.

Although most of the present chlorinated polymers will degrade when subjected to temperatures appreciably above 150° C. for long periods of time, their thermal stability can be appreciably improved by adding 0.1–4% of a stabilizer compound of one or more of the following types: organo-tin-sulfur, organo-tin, epoxy, aziridinyl, urea-phosphite, unsaturated aliphatic, fatty acid salt (cadmium, zinc or tin), or powdered calcium carbonate. These stabilizers may be added to the polymer, for example, by dissolving or suspending them in the polymer dope, or by dissolving or suspending them in a solvent such as methanol in which the polymer is insoluble, adding the polymer, mixing, and then evaporating to dryness.

The following examples will further illustrate the invention. The inherent viscosities of the unchlorinated polymers were measured in 60/40 (phenol/tetrachloroethane), and those of the chlorinated polymers were measured in chloroform.

*Example 1*

A polyester prepared from 83 mole percent of dimethyl terephthalate, 17 mole percent of dimethyl isophthalate, and 30/70 cis/trans-1,4-cyclohexanedimethanol was chlorinated by the following procedure. The polymer (27.4 g., 0.10 mole, based on the molecular weight of a polymer unit) of inherent viscosity 0.76 was dissolved in 250 ml. of boiling tetrachloroethane. The solution was cooled to room temperature, and 150 ml. of water and 50 g. of powdered calcium carbonate were added. While this mixture was stirred and irradiated with a 275-watt ultraviolet lamp, 32 g. (0.45 mole) of chlorine (measured as the weight loss of a lecture bottle) was added during 2 hours. The temperature was maintained at 25°–30° C. by cooling with a water bath. To ensure the neutralization of all of the HCl formed in the reaction, powdered sodium bicarbonate was added until the evolution of carbon dioxide ceased. The unreacted calcium carbonate was removed by filtration, and the organic layer was thoroughly washed with water to remove all salts. When the polymer solution was slowly added to methanol, the polymer precipitated as a white, fibrous material. It had an inherent viscosity of 0.37 and contained 35.7% chlorine. The polymer was soluble in methylene chloride, chloroform, and dioxane. A film, cast from methylene chloride, was self-extinguishing. The film had the following properties: tensile strength 10,300 p.s.i., elongation 9%, modulus $3.2 \times 10^5$ p.s.i., heat-distortion temperature (2% extension at 50 p.s.i.) 155° C., dielectric constant (at 1.0 kc. and 25°–125° C.) 3.5, dissipation factor (at 1.0 kc. and 25°–125° C.) 0.8–1.0%, resistivity $3.5 \times 10^{16}$ ohm-cm.

Example 2

The polyester of Example 1 with an inherent viscosity of 1.29 was chlorinated. The method of Example 1 was used, but the calcium carbonate was omitted and only 10.5 g. (0.15 mole) of chlorine was added. The product contained 14.6% chlorine and had an inherent viscosity of 0.51. It was soluble in methylene chloride, chloroform, and dioxane. The polymer was almost self-extinguishing. A film, cast from methylene chloride, had the following properties: tensile strength 8700 p.s.i., elongation 21%, moduls $2.8 \times 10^5$ p.s.i., heat-distortion temperature (2% extension at 50 p.s.i.) 125° C., dielectric constant (at 1.0 kc. and 25°–125° C.) 3.3–3.5, dissipation factor (at 1.0 kc. and 25°–125° C.) 0.7–2.7%, resistivity $4.0 \times 10^{16}$ ohm-cm.

Example 3

A polyester of inherent viscosity of 0.72 prepared from 50 mole percent dimethyl terephthalate, 50 mole percent dimethyl isophthalate, and 30/70 cis/trans-1,4-cyclohexane dimethanol was chlorinated by the procedure of Example 1 using 25 g. (0.35 mole) of chlorine. The product contained 29% chlorine and had an inherent viscosity of 0.35. The polymer was self-extinguishing. It was soluble in methylene chloride, chloroform, and dioxane. A film, cast from methylene chloride, had the following properties: tensile strength 11,900 p.s.i., elongation 3%, modulus $3.6 \times 10^5$ p.s.i., heat-distortion temperature (2% extension at 50 p.s.i.) 139° C.

Example 4

A polyester of inherent viscosity of 0.98 prepared from 50 mole percent of dimethyl 2,6-naphthalenedicarboxylate 50 mole percent of dimethyl isophthalate, and trans-1,4-cyclohexanedimethanol was chlorinated by the procedure of Example 1, using 35.5 g. (0.50 mole) of chlorine. The product contained 33.8% chlorine and had an inherent viscosity of 0.48. The polymer was soluble in methylene chloride, chloroform, and dioxane, and it was self-extinguishing.

Example 5

A polyester of inherent viscosity of 0.87 prepared from 80 mole percent of dimethyl 4,4'-diphenate, 20 mole percent of dimethyl o-phthalate, and 1/1 cis/trans-1,3- cyclohexanedimethanol was chlorinated by the procedure of Example 1, using visible illumination (300-watt lamp) and 14.2 g. of chlorine. The product contained 15.8% chlorine and had an inherent viscosity of 0.62. The polymer, which was not self-extinguishing, was soluble in methylene chloride and chloroform.

Example 6

A polyester of inherent viscosity of 0.96 prepared from dimethyl 4,4'-oxydibenzoate and 1,6-hexanediol was chlorinated by the procedure of Example 1, using 28.4 g. of chlorine. The product contained 25.5% chlorine and had an inherent viscosity of 0.46. The polymer, which was self-extinguishing, was soluble in methylene chloride and chloroform.

Example 7

A polyester of inherent viscosity of 0.79 prepared from dimethyl 4,4'-thiodibenzoate and 1,10-decanediol was chlorinated by the procedure of Example 1, using 0.6 mole of chlorine. The polymer contained 31.1% chlorine and had an inherent viscosity of 0.40. It was self-extinguishing. The polymer was soluble in methylene chloride, chloroform, and dioxane.

Example 8

Example 2 was repeated at 35°–40° C. without illumination but with the addition of 0.5 g. of diisopropylperoxydicarbonate. Whenever the chlorination slowed down, 0.2 g. more of the peroxy compound was added. The product had an ambient viscosity of 0.40 and a chlorine content of 13.1%.

Example 9

Example 8 was repeated with azobisisobutyronitrile instead of the peroxy compound. Similar results were obtained.

Example 10

A polyester prepared from 1,4-butanediol and isophthalic acid was chlorinated. The polymer (13.2 g., 0.06 mole, based on the molecular weight of a polymer unit) of inherent viscosity 1.04 was dissolved in 150 ml. of tetrachloroethane. Water (150 ml.) was added. While the mixture was stirred and irradiated with a 275-watt ultraviolet lamp, 12.8 g. (0.18 mole) of chlorine was added during 1 hour. The temperature of the reaction mixture was maintained at 10°–20° C. by cooling with a water bath. The organic layer was then thoroughly washed with sodium bicarbonate solution and water. Concentration under reduced pressure yielded the polymer. It had an inherent viscosity of 0.54 and contained 20.8% chlorine. The polymer was soluble in methylene chloride, chloroform, and dioxane and was self-extinguishing. The polymer was fractionated by dissolving in methylene chloride and precipitating in methanol. The polymer then contained 12.4% chlorine. A film, cast from methylene chloride, had the following properties: tensile strength =1830 p.s.i., elongation=270%, modulus=$0.4 \times 10^5$ p.s.i. The film was particularly valuable as a protective coating. When cast on glass or metallic surfaces, it adhered very tightly.

Example 11

The method of Example 10 was used for chlorinating 24 g. of a polyester of inherent viscosity 0.65 prepared from dimethyl trans-1,4-cyclohexanedicarboxylate and 2,2-dimethyl-1,3-propanediol. Weight of chlorine added to the mixture was 21 g. The product contained 27.2% chlorine and was self-extinguishing. It had an inherent viscosity of 0.40 and was soluble in methylene chloride, chloroform, and dioxane. A film, cast from methylene chloride, had the following properties: tensile strength =7000 p.s.i., elongation=6%, modulus= $3.6 \times 10^5$ p.s.i.

Example 12

The method of Example 10 was used for chlorinating 20 g. of a polyester of inherent viscosity 0.76 prepared from 2,2,4-trimethyl-1,3-pentanediol and dimethyl terephthalate. Weight of chlorine added was 15 g. The product contained 23.1% chlorine and was self-extinguishing. It had an inherent viscosity of 0.39 and was soluble in methylene chloride.

Example 13

Poly(ethylene terephthalate) (19.2 g., 0.10 unit mole) of inherent viscosity 1.16 was dissolved in a mixture consisting of 120 ml. of tetrachloroethane and 35 g. of trichloroacetic acid. While this solution was stirred and irradiated with a 275-watt ultraviolet lamp, 14.2 g. (0.20 mole) of chlorine was added during 1 hour. The temperature of the reaction mixture was maintained at 15°–20° C. by cooling with a water bath. The solution was then washed with water, sodium bicarbonate solution, and water again. The polymer was precipitated by slowly adding the solution to hexane while stirring. It had an inherent viscosity of 0.45 and contained 14.8% chlorine. The polymer was soluble in methylene chloride, chloroform, and dioxane. A film, cast from methylene chloride, was not quite self-extinguishing.

Example 14

A polyester (27.4 g., inherent viscosity 0.92) prepared from dimethyl terephthalate and 30/70 cis/trans-1,4-cyclohexanedimethanol was dissolved in a mixture consisting of 150 ml. of chloroform and 100 ml. of trifluoroacetic acid. It was chlorinated according to the method of Example 13, using 32 g. (0.45 mole) of chlorine. The product had an inherent viscosity of 0.40 and contained 34.2% chlorine. The polymer was soluble in methylene chloride, chloroform, and dioxane and was self-extinguishing. A film, cast from methylene chloride, had the following properties: tensile strength=11,100 p.s.i., elongation=8%, modulus=3.4×10$^5$ p.s.i., heat-distortion temperature (2% extension at 50 p.s.i.)=170° C. Self-extinguishing fibers were obtained by wet-spinning from methylene chloride into ethanol.

Example 15

A polyester (25 g., inherent viscosity 0.98) prepared from succinic acid and trans-1,4-cyclohexanediol was dissolved in a mixture consisting of 200 ml. of ethylene dichloride and 50 ml. of trifluoroacetic acid. It was chlorinated according to the method of Example 13, using 20 g. of chlorine. The product had an inherent viscosity of 0.39 and contained 26.1% chlorine. The polymer was soluble in methylene chloride, chloroform, and dioxane and was self-extinguishing.

The invention has been described in detail with particular reference to preferred embodiments thereof, but it will be understood that variations and modifications can be effected within the spirit and scope of the invention as described hereinabove and as defined in the appended claims.

We claim:

1. A polyester of at least one dibasic acid and at least one diol, said polyester consisting essentially of the repeating unit

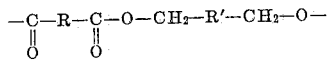

wherein R is a bivalent radical selected from the group consisting of radicals of the formulas:

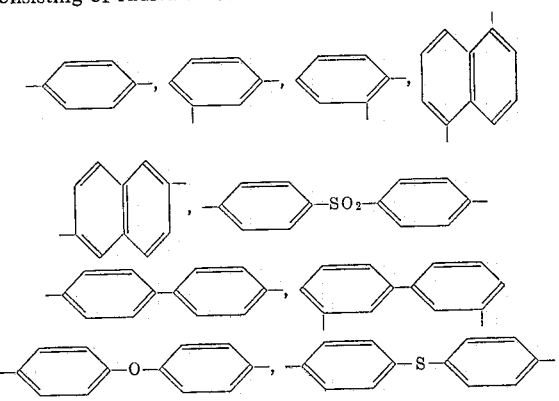

and $-(CH_2)_n-$, wherein $n$ is 2–10 and R' is a member selected from the group consisting of 1,2-cyclohexylene, 1,3-cyclohexylene, 1,4-cyclohexylene, and $-(CH_2)_m-$, wherein $m$ is 0–10, said polyester having an inherent viscosity as measured in 60/40 phenol/tetrachloroethane at 25° C. of from about 0.3 to 2.0, said polyester containing from about 5 to about 50% by weight of chlorine wherein at least 50 percent of the chlorination takes place on —CH$_2$— groups which are covalently bonded to other carbon atoms.

2. A polyester of a dibasic acid component at least 50 mole percent of which is an aromatic dibasic acid and a dihydroxy component at least 50 mole percent of which is a compound selected from the group consisting of 1,2-cyclohexanedimethanol, 1,3-cyclohexanedimethanol and 1,4-cyclohexanedimethanol, said polyester containing on the dihydroxy component from about 5 to about 50% by weight of chlorine atoms to render it readily soluble in at least one solvent selected from the group consisting of methylene chloride, chloroform and dioxane.

3. A polyester consisting essentially of the repeating unit

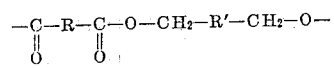

wherein R is a bivalent radical selected from the group consisting of radicals of the formulas:

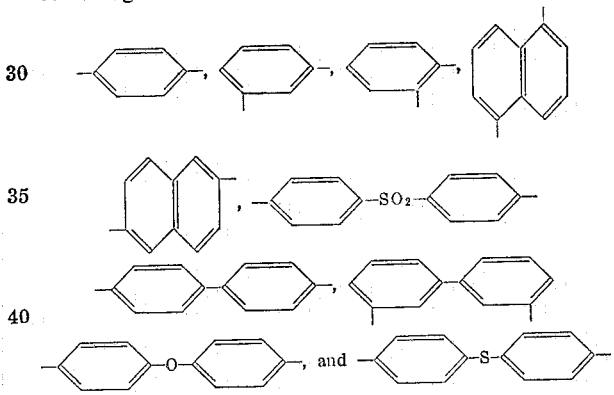

and R' is a bivalent alicyclic radical selected from the group consisting of 1,2-, 1-3-, and 1,4-cyclohexylene wherein from about 5 to about 60% of the hydrogen atoms of these alicyclic radicals are replaced by chlorine atoms, said polyester having an inherent viscosity as measured in 60/40 phenol/tetrachloroethane at 25° C. of from about 0.3 to 2.0.

4. A polyester of terephthalic acid, isophthalic acid, and 1,4-cyclohexanedimethanol, said polyester containing on the cyclohexane component from about 5 to about 50% by weight of chlorine atoms to render it readily soluble in at least one solvent selected from the group consisting of methylene chloride, chloroform and dioxane.

5. A polyester of about 83 mole percent terephthalic acid, about 17 mole percent isophthalic acid, and 1,4-cyclohexanedimethanol, said polyester containing from about 5 to about 50% by weight of chlorine atoms to render it readily soluble in at least one solvent selected from the group consisting of methylene chloride, chloroform and dioxane.

6. A polyester of 2,6-napthalenedicarboxylic acid, isophthalic acid and 1,4-cyclohexanedimethanol, said polyester containing from about 5 to about 50% by weight of chlorine atoms to render it readily soluble in at least one solvent selected from the group consisting of methylene chloride, chloroform and dioxane.

7. A polyester of 4,4'-diphenic acid, orthophthalic acid and 1,3-cyclohexanedimethanol, said polyester containing from about 5 to about 50% by weight of chlorine atoms to render it readily soluble in at least one solvent selected from the group consisting of methylene chloride, chloroform and dioxane.

8. A polyester of 4,4'-oxydibenzoic acid and 1,2-cyclohexanedimethanol, said polyester containing on the cyclohexane component from about 5 to about 50% by weight of chlorine atoms to render it readily soluble in at least one solvent selected from the group consisting of methylene, chloride, chloroform and dioxane.

9. A polyester of 4,4'-thiodibenzoic acid and 1,3-cyclohexanedimethanol, said polyester containing on the cyclohexane component from about 5 to about 50% by weight of chlorine atoms to render it readily soluble in at least one solvent selected from the group consisting of methylene chloride, chloroform and dioxane.

10. The process for preparing the polyester of claim 2 wherein from about 5 to about 60% of the alicyclic hydrogens are replaced with chlorine atoms, comprising preparing the unchlorinated polyester and dissolving the same in a chlorination medium comprising (A) a chlorinated hydrocarbon having 1-2 carbon atoms and 2-5 chlorine atoms and (B) from about 0 to about 50% by weight of a trihalo acid selected from the group consisting of trichloro- and trifluoro-acetic acids, and contacting at a temperature within the range of 0 to 100° C. the polyester with chlorine in the presence of a chlorination promoter selected from the group consisting of ultraviolet radiation, visible light, and a free-radical initiator.

11. The process for preparing the polyester of claim 2 wherein from about 5 to about 60% of the alicyclic hydrogens are replaced with chlorine atoms, comprising preparing the unchlorinated polyester and dissolving the same in a chlorination medium comprising (A) a chlorinated hydrocarbon having 1-2 carbon atoms and 2-5 chlorine atoms and (B) from about 0 to about 50% by weight of a trihalo acid selected from the group consisting of trichloro- and trifluoro-acetic acids, and contacting at a temperature within the range of 0 to 100° C. the polyester with chlorine in the presence of a chlorination promoter selected from the group consisting of ultraviolet radiation, visible light, and a free-radical initiator, and wherein sufficient water is present to reduce the concentration of HCl in the organic phase and hence the tendency of the polymer to hydrolyze.

12. The process for preparing the polyester of claim 2 wherein from about 5 to about 60% of the alicyclic hydrogens are replaced with chlorine atoms, comprising preparing the unchlorinated polyester and dissolving the same in a chlorination medium comprising (A) a chlorinated hydrocarbon having 1-2 carbon atoms and 2-5 chlorine atoms and (B) from about 0 to about 50% by weight of a trihalo acid selected from the group consisting of trichloro- and trifluoro-acetic acids, and contacting at a temperature within the range of 0 to 100° C. the polyester with chlorine in the presence of a chlorination promoter selected from the group consisting of ultraviolet radiation, visible light, and a free-radical initiator, and wherein $CaCO_3$ is dispersed in the reaction medium to neutralize the HCl formed.

13. The process for preparing the polyester of claim 2 wherein from about 5 to about 60% of the alicyclic hydrogens are replaced with chlorine atoms, comprising preparing the unchlorinated polyester and dissolving the same in a chlorination medium comprising (A) a chlorinated hydrocarbon having 1-2 carbon atoms and 2-5 chlorine atoms and (B) from about 0 to about 50% by weight of a trihalo acid selected from the group consisting of trichloro- and trifluoro-acetic acids, and contacting the polyester with chlorine in the presence of a chlorination promoter selected from the group consisting of ultraviolet radiation, visible light, and a free-radical initiator, and wherein sufficient water is present to reduce the concentration of HCl in the organic phase and hence the tendency of the polymer to hydrolyze, and wherein $CaCO_3$ is dispersed in the reaction medium to neutralize the HCl formed.

14. A fiber formed from the composition of claim 1.

15. A film formed from the composition of claim 1.

16. A molded article formed from the composition of claim 1.

17. Poly(ethylene terephthalate) having an I.V. of at least about 0.3 and containing at least about 5 percent by weight of chlorine substituted on the —$CH_2$— groups.

18. A fiber formed from the composition of claim 17.

19. A film formed from the composition of claim 17.

20. A molded article formed from the composition of claim 17.

21. A process for chlorinating poly(ethylene terephthalate) comprising dissolving poly(ethylene terephthalate) in a solvent mixture comprising a chlorinated hydrocarbon having 1-2 carbon atoms and 2-5 chlorine atoms and from about 5 to about 50% by weight of a trihalo acid selected from the group consisting of trichloro- and trifluoro-acetic acid and contacting the polymer at a temperature of from about 10 to about 40° C. with chlorine in the presence of a chlorination promoter.

22. The process for preparing a polyester of claim 1 comprising dissolving the unchlorinated polymer in a chlorinated hydrocarbon and contacting the polymer at a temperature of from about 0 to about 100° C. with chlorine in the presence of a chlorination promoter.

23. A process for chlorinating a polyester as defined by claim 1 comprising dissolving the polyester in a solvent mixture comprising a chlorinated hydrocarbon having 1-2 carbon atoms and 2-5 chlorine atoms and from about 5 to about 50% by weight of a trihalo acid selected from the group consisting of trichloro- and trifluoro-acetic acid and contacting the polymer at a temperature of from about 10 to about 40° C. with chlorine in the presence of a chlorination promoter.

24. A composition of matter comprising
(1) a difficultly soluble polyester as defined by claim 1 and
(2) a solvent for said difficultly soluble polyester, said solvent comprising a mixture of (A) at least one chlorinated hydrocarbon having 1-2 carbon atoms and 2-5 chlorine atoms and (B) from about 5 to about 50% by weight of a trihalo acids selected from the group consisting of trichloro- and trifluoro-acetic acid.

References Cited

UNITED STATES PATENTS

| | | | |
|---|---|---|---|
| 2,779,701 | 1/1957 | Robitschek et al. | 260—30.6 |
| 2,912,409 | 11/1959 | Nischk et al. | |
| 2,965,613 | 12/1960 | Milone et al. | 260—30.4 |
| 2,981,754 | 4/1961 | Wynn. | |
| 3,216,970 | 11/1965 | Conix | 260—30.4 |

MORRIS LIEBMAN, *Primary Examiner.*

L. T. JACOBS, *Assistant Examiner.*

UNITED STATES PATENT OFFICE
CERTIFICATE OF CORRECTION

Patent No. 3,356,631                        December 5, 1967

Winston J. Jackson, Jr., et al.

It is hereby certified that error appears in the above numbered patent requiring correction and that the said Letters Patent should read as corrected below.

Column 8, lines 59 and 66, after "containing", each occurrence, insert -- on the cyclohexane component --; column 10, line 2, after "contacting" insert -- at a temperature within the range of 0 to 100° C. --.

Signed and sealed this 18th day of February 1969.

(SEAL)
Attest:

Edward M. Fletcher, Jr.                     EDWARD J. BRENNER

Attesting Officer                            Commissioner of Patents